(12) United States Patent
Kwok et al.

(10) Patent No.: US 12,443,959 B2
(45) Date of Patent: Oct. 14, 2025

(54) SYSTEMS AND METHODS FOR EXTERNAL ACCOUNT AUTHENTICATION

(71) Applicant: Capital One Services, LLC, McLean, VA (US)

(72) Inventors: Jennifer Kwok, Brooklyn, NY (US); Sara Rose Brodsky, New York, NY (US); Jason Zwierzynski, Chapel Hill, NC (US); Joshua Edwards, Carrollton, TX (US); Abhay Donthi, Washington, DC (US); Tania Cruz Morales, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 443 days.

(21) Appl. No.: 18/049,092

(22) Filed: Oct. 24, 2022

(65) Prior Publication Data

US 2024/0135381 A1 Apr. 25, 2024
US 2024/0232890 A9 Jul. 11, 2024

(51) Int. Cl.
*G06F 21/31* (2013.01)
*G06F 21/62* (2013.01)
(Continued)

(52) U.S. Cl.
CPC ......... *G06Q 20/4016* (2013.01); *G06F 21/62* (2013.01); *G06Q 20/382* (2013.01)

(58) Field of Classification Search
CPC .. G06Q 20/4016; G06Q 20/382; G06Q 20/40; G06F 21/62; G06F 21/31; H04L 9/40
See application file for complete search history.

(56) References Cited

U.S. PATENT DOCUMENTS 10,320,807 B2   6/2019  Khan
10,699,267 B2 * 6/2020  Bauer ................... G06Q 20/36
(Continued)

FOREIGN PATENT DOCUMENTS

CA   2851691 A1 *  5/2013  ............. G06F 21/34
CA   3119829 A1 * 11/2014  ............ G06F 16/951
(Continued)

OTHER PUBLICATIONS

Anshu Malhotra et al., "Studying User Footprints in Different Online Social Networks", 2012 IEEE/ACM International Conference on Advances in Social Networks Analysis and Mining, Aug. 26, 2012, pp. 1065-1070, DOI: 10.1109/ASONAM.2012.184.
(Continued)

*Primary Examiner* — Jayesh M Jhaveri
(74) *Attorney, Agent, or Firm* — Bookoff McAndrews, PLLC (57) ABSTRACT

Systems and methods for external account authentication are disclosed herein. They include receiving a call to pair the external account with a secure account, extracting external data from the external account, the external data corresponding to external account content, providing user activity data from the secure account as an input to an authentication machine learning model, providing the external data as an input to the authentication machine learning model, the authentication machine learning model configured to output a certainty level that the external account is associated with a user of the secure account based on the external data and the activity data, receiving the certainty level from the authentication machine learning model, determining that the certainty level meets a certainty threshold, and pairing the external account with the secure account based on determining that the certainty level meets the certainty threshold.

20 Claims, 6 Drawing Sheets

(51) Int. Cl.
    *G06Q 20/38*      (2012.01)
    *G06Q 20/40*      (2012.01)
    *H04L 9/40*      (2022.01)

(56) References Cited

U.S. PATENT DOCUMENTS

| | | |
|---|---|---|
| 11,120,519 B2 | 9/2021 | Kapczynski |
| 2015/0365388 A1 | 12/2015 | Little et al. |
| 2020/0167784 A1* | 5/2020 | Kursun .............. G06Q 20/4016 |
| 2021/0081947 A1* | 3/2021 | Hockey .............. H04L 63/0838 |
| 2021/0192027 A1* | 6/2021 | Malton ................ H04W 12/06 |
| 2021/0287107 A1 | 9/2021 | Badawy et al. |
| 2022/0084037 A1* | 3/2022 | Fang ................. G06Q 20/4016 |

FOREIGN PATENT DOCUMENTS

| | | | |
|---|---|---|---|
| CA | 3208978 A1 * | 7/2022 | ......... G06Q 20/4016 |
| EP | 2866421 A1 | 4/2015 | |

OTHER PUBLICATIONS

Kai Shu et al., "User Identity Linkage across Online Social Networks: A Review", ACM SIGKDD Explorations Newsletter, Association for Computing Machinery, Inc, vol. 18, No. 2, Mar. 22, 2017, pp. 5-17, DOI: 10.1145/3068777.3068781.
Kaikai Deng et al., "A User Identification Algorithm Based on User Behavior Analysis in Social Networks", IEEE Access, vol. 7, pp. 47114-47123, DOI: 10.1109/ACCESS.2019.2909089.
Yuanzhuo Wang et at., "Prediction of purchase behaviors across heterogeneous social networks", The Journal of Supercomputing, vol. 71, No. 9, Aug. 12, 2015, pp. 3320-3336, DOI: 10.1007/S11227-015-1495-8.

* cited by examiner

SYSTEMS AND METHODS FOR EXTERNAL ACCOUNT AUTHENTICATION

TECHNICAL FIELD

Various embodiments of the present disclosure relate generally to external account verification using machine learning models, and more particularly, to systems and methods for authenticating external accounts based on external account content.

BACKGROUND

Users often have multiple accounts which are segregated from each other. Often, users operate such accounts separately such that data associated with a first account does not benefit from the data associated with a third party account. Example third party accounts can include social media accounts that include content associated with a user. By operating accounts separately, traditional systems cannot take advantage of security measures available through the exchange of data between such accounts.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for authenticating external accounts. These include methods and systems for external account authentication including receiving a call to pair the external account with a secure account; extracting external data from the external account, wherein the external data corresponds to external account content; providing user activity data from the secure account as an input to an authentication machine learning model; providing the external data as an input to the authentication machine learning model, the authentication machine learning model configured to output a certainty level that the external account is associated with a user of the secure account based on the external data and the user activity data; receiving the certainty level from the authentication machine learning model; determining that the certainty level meets a certainty threshold; and pairing the external account with the secure account based on determining that the certainty level meets the certainty threshold.

The methods and systems further include outputting a certainty level with which an external account is associated with a user of a secure account, using an authentication machine learning model, by receiving user activity data from the secure account as an input to the authentication machine learning model; receiving external data from the external account as an input to the authentication machine learning model, wherein the external data corresponds to external account content; determining at least one of an overlap or correlation between the activity data and the external data; applying trained weights, layers, or biases to generate at least one of an overlap score or correlation score based on the overlap or correlation; determining the certainty level based on at least one of the overlap score or correlation score; and outputting the certainty level with which the external account is associated with the user of the secure account.

The methods and systems further include external account authentication, using a data storage device storing processor-readable instructions; and a processor operatively connected to the data storage device and configured to execute the instructions to perform operations that include: receiving a call to pair the external account with a secure account; extracting external data from the external account, wherein the external data corresponds to external account content; providing user activity data from the secure account as an input to an authentication machine learning model; providing the external data as an input to the authentication machine learning model, the authentication machine learning model configured to output a certainty level that the external account is associated with a user of the secure account based on the external data and the activity data; receiving the certainty level from the authentication machine learning model; determining that the certainty level meets a certainty threshold; and pairing the external account with the secure account based on determining that the certainty level meets the certainty threshold.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

According to certain aspects of the disclosure, methods and systems are disclosed for authenticating external accounts based at least on a user's activity data associated with a secure account and external data associated with the external account. An external account may be authenticated based on, for example, the overlap or correlation between a given user's activity and external account content associated with the user. The overlap or correlation may be used to generate a certainty level that indicates the likelihood (e.g., a score) that the external account is owned by the same owner as the secure account. A user's activity may be extracted from information available via the secure account.

For example, the user's activity may be extracted based on purchases made by the user, as recorded via the secure account.

External data may be extracted from the external account (e.g., by using an application programming interface (API) that patches into the external account). For example, the external account may be a social media account that includes user submitted posts. The overlap or correlation between the user activity and external data may be determined using an authentication machine learning model. The authentication machine learning model may be trained to output a certainty level that the external account is owned by the same owner as the secure account. The certainty level may be output based on the degree, type, amount, and/or frequency of overlap or correlation.

If the certainty level meets a certainty threshold, then the secure account may be paired with the external account. The pairing may be used to perform one or more of security verifications (e.g., validate transactions based on geolocation tags), log-in authentications (e.g., two-factor authentication via the external account), secure account related communication via the external account, cross pollination of information, or the like. User data, as described herein, may be input by a user with the call to pair the external account.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The techniques disclosed herein provide technical benefits including automated access to one or more secure accounts without providing unique credentials for the secure accounts, and automated security verifications. The security verifications may be automated such that a user's location, and/or other contextual information may be automatically extracted from an external account, and such information may be applied to secure components of a secure account. For example, a purchase or transaction via a secure account may be verified based on external account content. Such automation may reduce processing time and resources. Such reduction in processing time and resources may be implemented by removing processing steps for verification of secure account activities, based on the automated verification provided via external account content. For example, a secure account activity (e.g., a transaction approval) may be based on confirming a user's location. Traditionally, such verification may require geolocation data, or a user submission of location. Accordingly, by eliminating the need for such geolocation data and/or user submission, the processing required to obtain the verification may be implemented without geolocation or user data, sensors, and/or associated processing time.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistic regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve authentication machine learning, it should be understood that techniques according to this disclosure may be adapted to any suitable type of machine learning. It should also be understood that the examples above are illustrative only. The techniques and technologies of this disclosure may be adapted to any suitable activity.

A secure account may be any account that is associated with one or more users and includes information about the one or more users. A secure account may be accessed using credentials such as, for example, login credentials, biometric credentials, or the like. As further disclosed herein, a secure account may be accessed using an external account. For example, a secure account may be accessed using an external account if a threshold certainty level is met. A secure account may include, gather, or otherwise capture information related to, by way of example only, transactions associated with a user. For example, a secure account may include an ongoing record of purchases and related information (e.g., amounts, times, types, products, services, etc.). A secure account may also approve and/or deny transactions based on given criteria. For example, as further disclosed herein, a secure account may authorize one or more transactions in a given geographical location, based on data from a paired external account indicating that the owner of the secure account is at or near the given geographical location.

An external account may be an account that is different than a secure account. An external account may be, for example, a social media account, a metaverse account, or any other account that includes external data that may include one or more posts, time stamps, interactions, impressions, content (e.g., images, videos, text, comments, tags, avatars, publications, activities, etc.) or the like or a combination thereof. For example, the external data may include social media profile data (e.g., demographic information, information about connections, historical information, etc.) and/or social media activity data (e.g., based on content). A social media account may be any account with which users are able to create and share information, ideas, personal messages, and/or other content or to participate in social networking. A user may be able to connect with one or more users via a social media account platform.

An API may be used to access external data from the external account. The API may be used to connect to an external account based on a user granting access (e.g., by providing login credentials) to the external account. The API may be configured to extract external data from the external account by requesting and/or receiving content and/or metadata from the external account. The API may request and/or receive content and/or metadata specific to the user associated with the access information (e.g., the user associated with the login credentials).

Activity data may be data about a user's actions or events. Activity data may be extracted from a secure account. Activity data may include, but is not limited to, transaction data, amounts, times, locations (e.g., based on transaction locations, merchant locations, etc.), categories, products, services, etc. Activity data may be generated when a user takes an action or triggers an event. For example, a user may make a purchase and activity data associated with that purchase may be generated and accessible via the corresponding secure account. It will be understood that the lack of data (e.g., at a given time) may also be considered activity data. For example, if no transaction is recorded on a given day, that lack of a transaction may be considered activity data.

User data may be data about a user and may be extracted from a secure account, an application, or based on one or more other resources having information about a given user. User data may include identifiers (e.g., demographic identifiers, identification information (e.g., name, photo identification, biometric information, etc.), contact identifiers (e.g., email, phone number, address, etc.), time information, digital content, or the like. According to an implementation, at least some types of user data may overlap with types of social media profile information (e.g., name, address, etc.).

A certainty level may be a likelihood, a degree, a probability, a possibility or the like that an external account is associated with the owner of a secure account. The certainty level may be quantified as a numerical value (e.g., a level from one or more levels), a score, a percentage, a degree, or the like. For example, a certainty level may be a high certainty level, a low certainty level, a number (e.g., ranging from 0-10), or the like. The certainty level may be output by an authentication machine learning model, as further discussed herein.

Figure 1:
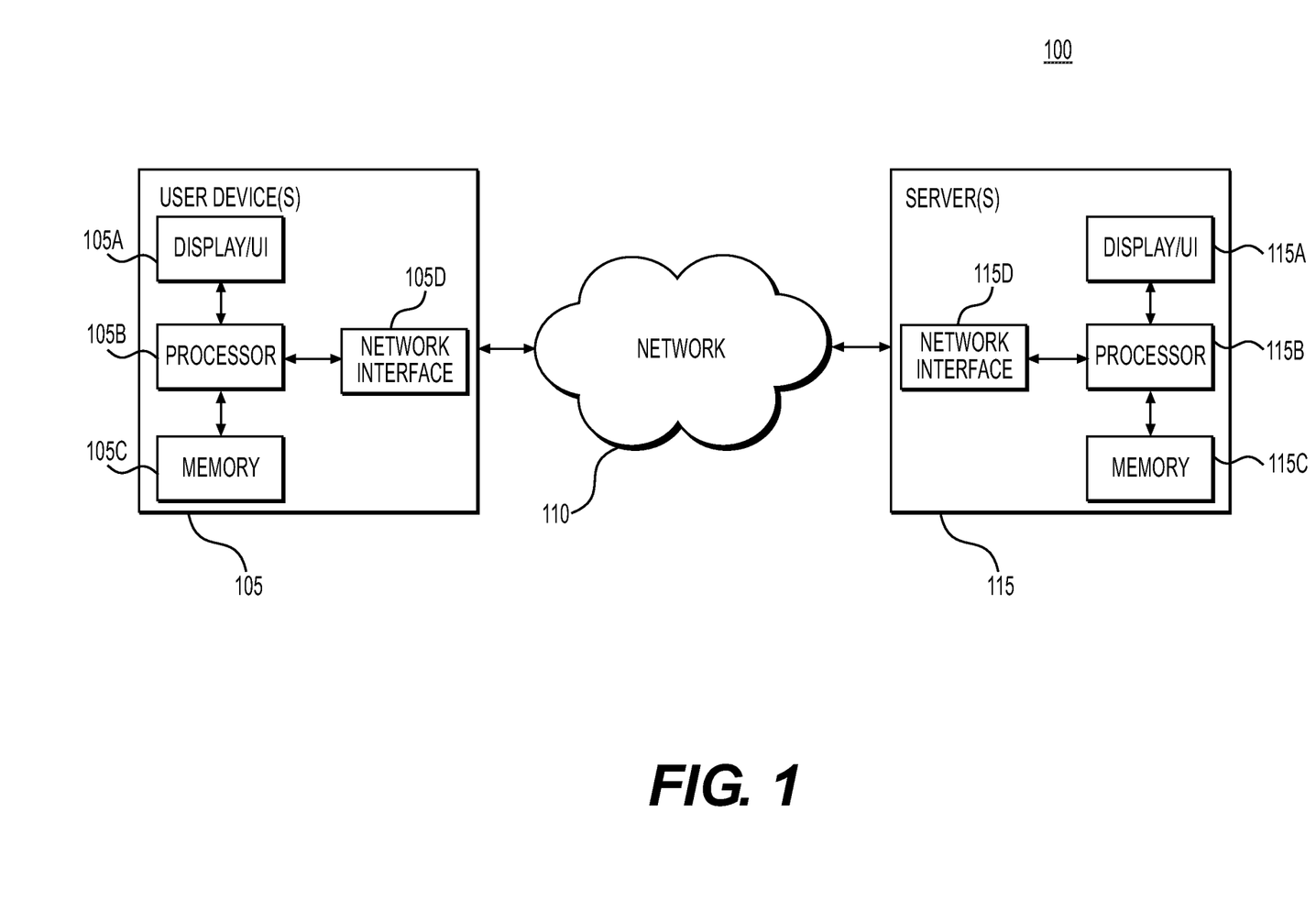
FIG. 1 depicts an exemplary environment for accessing one or more accounts, according to one or more embodiments.

FIG. 1 depicts an exemplary system 100 for authenticating an external account, according to one or more embodiments, and which may be used with the techniques presented herein. The system 100 may include one or more user device(s) 105 (hereinafter "user device 105" for ease of reference), a network 110, one or more server(s) 115 (hereinafter "server 115" for ease of reference). While only one of each of user device 105 and server 115 are depicted, the disclosure is not limited to one of each and two or more of each of user device 105 and server 115 may be implemented in accordance with the techniques disclosed herein.

User device 105 may be used to, for example, access a secure account, access an external account, submit a call to pair the external account with the secure account, generate activity data, generate external data, or the like. Server 115 may be a secure server (e.g., may host a secure account), an external server (e.g., may host an external account), a merchant server (e.g., to facilitate transactions), or the like.

The user device 105 and the server 115 may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S). The memory 115C may also store one or more instances of a machine learning model (e.g. a current machine leaning model, updated machine learning model, authentication machine learning model, etc.) as well as one or more model states. The display/UI 115A may be a touch screen or a display with other input systems (e.g., mouse, keyboard, etc.) for an operator of the server 115 to control the functions of the server 115. The network interface 115D may be a TCP/IP network interface for, e.g., Ethernet or wireless communications with the network 110.

The user device 105 may include a display/UI 105A, a processor 105B, a memory 105C, and/or a network interface 105D. The user device 105 may be a mobile device, such as a cell phone, a tablet, etc. The user device 105 may execute, by the processor 105B, an operating system (OS), a machine learning training component, an feedback and/or level of success, or the like. One or more components shown in FIG. 1 may generate or may cause to be generated one or more graphic user interfaces (GUIs) based on instructions/information stored in the memory 105C, instructions/information received from the server 115, and/or the one or more user devices 105. The GUIs may be mobile application interfaces or browser user interfaces, for example.

In various embodiments, the network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the one or more components of exemplary system 100 may one or more of (i) generate, store, train, or use a machine learning model or its applicable components or attributes such as notes, model states, weights, layers, or the like. The exemplary system 100 or one of its components may include a machine learning model and/or instructions associated with the machine learning model, e.g., instructions for generating a machine learning model, training the machine learning model, using the machine learning model, etc. The exemplary system 100 or one of its components may include instructions for retrieving data, adjusting data, e.g., based on the output of the machine learning model, and/or operating a display to output data, e.g., as adjusted based on the machine learning model. The exemplary system 100 or one of its components may include, provide, and/or generate training data.

In some embodiments, a system or device other than the components shown in exemplary system 100 may be used to generate and/or train the machine learning model. For example, such a system may include instructions for generating the machine learning model, the training data and ground truth, and/or instructions for training the machine learning model. A resulting trained machine learning model may then be provided to exemplary system 100 or one of its components. The machine learning model may be stored in any applicable location such as in memory 115C or memory 105C, in a location other than system 100 in operable communication with system 100, or the like.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Alternatively or in addition, unsupervised learning and/or semi-supervised learning may be used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data (e.g., secure user data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include image-processing architecture that is configured to identify, isolate, and/or extract features, geometry, and or structure. For example, the machine learning model may include one or more convolutional neural networks ("CNN") configured to identify features in the data, and may include further architecture, e.g., a connected layer, neural network, etc., configured to determine a relationship between the identified features in order to determine a location in the data.

In some instances, different samples of training data and/or input data may not be independent. Thus, in some embodiments, the machine learning model may be configured to account for and/or determine relationships between multiple samples.

For example, in some embodiments, the machine learning models referenced in FIGS. 2A, 2B, 3 and 4 may include a CNN, or Recurrent Neural Network ("RNN"). Generally, RNNs are a class of feed-forward neural networks that may be well adapted to processing a sequence of inputs. In some embodiments, the machine learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of items (e.g., words, letters, time series, images) as input, and generate another sequence items (e.g., where they may convert sequences of one domain to sequences of another domain). For example, a Seq2Seq model may, for example, be configured to receive image data and output location data associated with the received image data (e.g., a location where an image was captured).

Although depicted as separate components in FIG. 1, it should be understood that a component or portion of a component in the exemplary system 100 may, in some embodiments, be integrated with or incorporated into one or more other components. For example, a portion of the display 105A may be integrated into the user device 105 or the like. In another example, the server 115 may be integrated in a data storage system. In some embodiments, operations or aspects of one or more of the components discussed above may be distributed amongst one or more other components. Any suitable arrangement and/or integration of the various systems and devices of the exemplary system 100 may be used.

Further aspects of the machine learning model and/or how it may be utilized to authorize an external account, generate certainty scores, etc. are described herein. In the following methods, various acts may be performed or executed by a component from FIG. 1, such as the server 115, the user device 105, or components thereof. However, it should be understood that in various embodiments, various components of the exemplary system 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

As applied herein, one or more model states may correspond to weights, layer configurations, variables, or the like that can be used with a machine learning model. A model state may be a numerical value or may be a relationship that can be used by a machine learning model to generate an output.

Figure 2A:
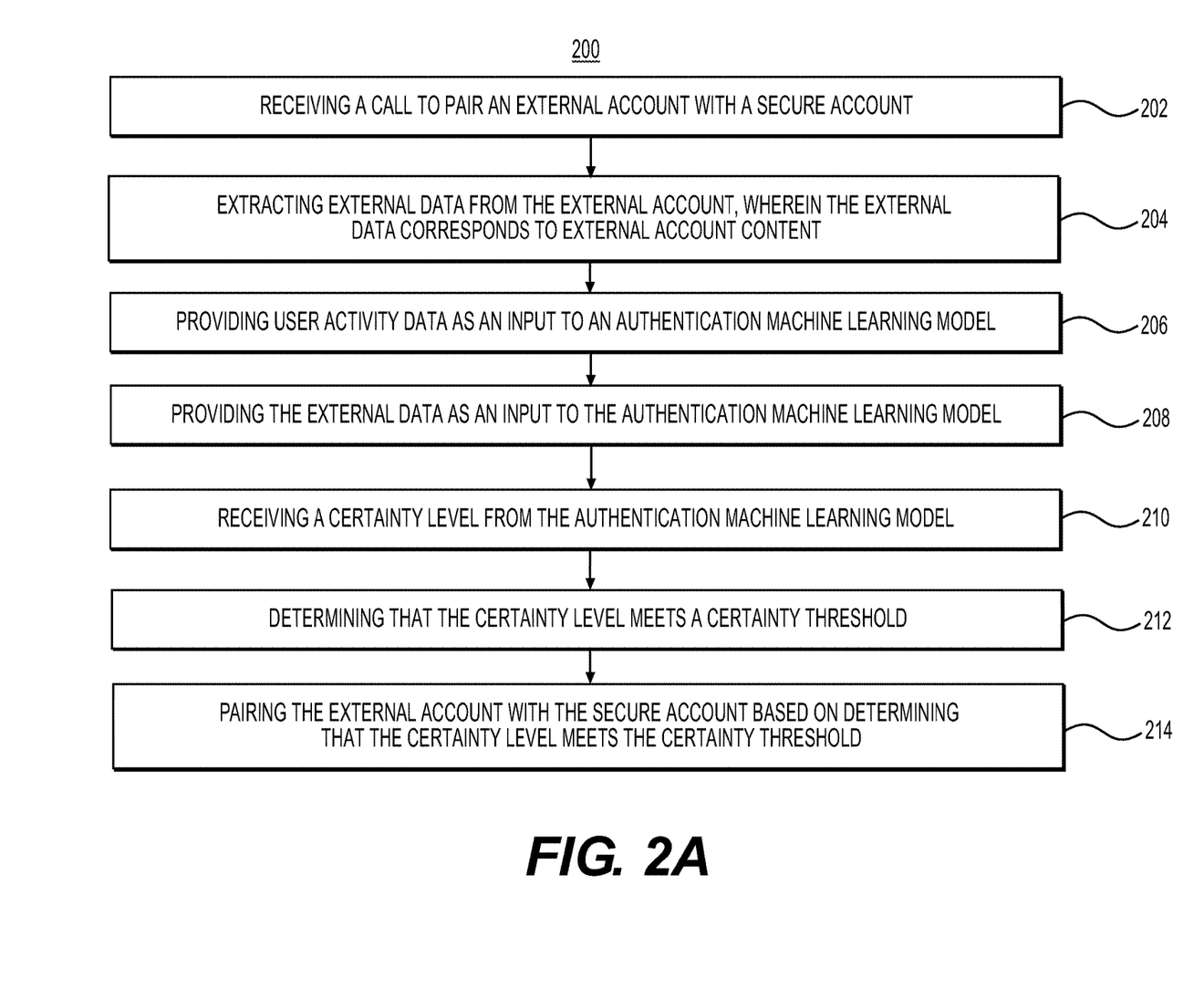
FIG. 2A depicts a flowchart of an exemplary method of authenticating an external account, according to one or more embodiments.

As shown in flowchart 200 of FIG. 2A, a call to pair an external account to a secure account may be received at 202. A call may be a request, a pull, a transmission, a signal, or the like. The call may be generated based on a user request to pair the external account to the secure account (e.g., via user device 105). A determination may be made that a secure account platform has access to an API associated with the external account platform, and based on the determination, the option to pair the given external account to a user's secure account may be provided to the user. The determination may be made based on accessing an API list to extract which external account platforms the secure account is compatible with.

The call to pair the external account with the secure account may be submitted with credentials for one or both of the external account and secure account. For example, a user may log into a secure account (e.g., using login credentials) and may provide external account credentials via the secure account platform. According to an implementation, the external account credentials may be encrypted such that the secure account does not receive the external account credentials. Rather, the external account credentials may be encrypted and/or transmitted to a corresponding external account platform via corresponding API. Accordingly, the secure account platform may use the external account credentials to authenticate the external account and may not store the external account credentials.

At 204 of FIG. 2A, external data may be extracted from the external account. The external account data may correspond to external account content. The external data may be extracted from the external account based on access to the external account. The access to the external account may be made available based on external account credentials provided at 202, as disclosed herein.

The external account data may be extracted based on one or more extraction techniques. The extraction techniques may include content recognition. According to an embodiment, image recognition may be conducted using a content recognition classifier and/or machine learning model. The classifier or model may receive one or more external account content (e.g., images, videos, etc.) and may identify attributes based on the external account content. For example, metadata or other data associated with the content may be extracted to identify one or more attributes. Alternatively, the external account content may be classified as including one or more attributes. The attributes may include, for example, location information, time, activity, proximity information, or the like. As an example, a user may post an image at the Eiffel Tower. The external account content recognition classifier and/or machine learning model may receive the image and may identify the Eiffel Tower. Accordingly, the user's location corresponding to the Eiffel Tower as well as one or more other attributes such as the time the image was captured or posted, the duration of time between the image and another image in a different location, or other attributes may be identified.

According to an implementation, the external account data may include user content (e.g., actions) in a metaverse account. For example, a user input in the metaverse account may be used to extract a user's location during access to the metaverse account. Additionally, in-app purchases or other actions taken within the metaverse account may be extracted. A user history may be generated based on user actions in the metaverse account and/or other external accounts. The user history may be used to extract and/or predict attributes.

At 206, user activity data may be provided as an input to an authentication machine learning model. User activity data may be extracted from a secure account (e.g., a user's bank account, a user's transaction account, or the like). Although user activity data is generally associated with user transactions herein, it will be understood that user activity data may be extracted from any user action, inaction, input, or the like.

User activity data may be extracted based on access to the secure account, as described herein. The user activity data may be extracted from the secure account and may be parsed, identified, extracted, or the like, by one or more processors. The user activity data may be extracted in a first format (e.g., a format that the user activity data is provided in via the secure account). The first format may be converted to a second format receivable by a machine learning model. The user activity data may be provided to a machine learning model (e.g., an authentication machine learning model, described in further detail below) in any applicable format. For example, the user activity data may be provided as raw data directly from the secure account into the authentication machine learning model, via, for example, one or more APIs. Alternatively, the user activity data may be extracted and parsed, and the parsed user activity data may be input into the authentication machine learning model in an applicable format.

User activity data may include, or may be used to determine or predict, one or more attributes. User activity data may be used to determine a user action. For example, user activity data may include one or more transactions generated by the user. The transactions may be recorded at the secure account and may include transaction information such as a location of the transaction, a time of the transaction, a distance between multiple transactions, a time between multiple transactions, a type of transaction, a good or service associated with the transaction, a predicted location based on the transaction (e.g., based on purchasing a travel ticket or accommodation), or the like.

At 208, the external account data (e.g., the external account data extracted at 204) may be input to the authentication machine learning model. The external account data may be extracted from the external account (e.g., in a manner similar to extracting secure data from the secure account, or in a different manner). Alternatively, the external account data may be provided directly from the external account to the authentication machine learning model. The external account data may be extracted in a first format (e.g., external account format) and may be converted to a second format (e.g., a format configured for the authentication machine learning model). The external account data and/or the user activity data may be provided to the authentication machine learning model at approximately the same time (e.g., when a request to associate the external account is received at 202). Alternatively, the external account data and/or user activity data may be provided to the authentication machine learning model in any order or at any time (e.g., on an ongoing basis, on a periodic basis, etc.).

The external account data may be input to the authentication machine learning model in its raw format (e.g., as extracted from the external account). Alternatively, or in addition, the external account data may be analyzed (e.g., via a content recognition machine learning model and/or classifier) and the analyzed data may be provided to the authentication machine learning model in an applicable format.

The authentication machine learning model may be trained to output a certainty level that the external account is associated with the user of the secure account. The authentication machine learning model may be trained using any applicable technique to determine the certainty level based on the external account data and the user activity data. According to an implementation, the authentication machine learning model may be trained using any applicable technique to determine the certainty level based further on user data that may also be provided as an input to the machine learning model. User data may be different than user activity data. As disclosed herein, user data may be data about a user and may be extracted from a secure account, an application, or based on one or more other resources having information about a given user. User data may include demographic information, identification information (e.g., name, photo identification, biometric information, etc.), contact information (e.g., email, phone number, address, etc.), digital content, or the like. According to an implementation, at least some types of user data may overlap with types of social media profile information (e.g., name, address, etc.).

The authentication machine learning model may be trained by adjusting one or more weights, layers, and/or biases during a training phase. During the training phase, historical or simulated external account data, user activity data, and/or user data may be provided as inputs to the model. According to an example, historical or simulated overlaps or correlations between the historical or simulated external account data, user activity data, and/or user data may be provided to train the model. The model may adjust one or more of its weights, layers, and/or biases based on such historical or simulated information. The adjusted weights, layers, and/or biases may be configured in a production authentication machine learning model (e.g., a trained model) based on the training. Once trained, the authentication machine learning model may output certainty levels based on input external account data, user activity data, and/or user data. According to an implementation, the trained authentication machine learning model may continuously update based on feedback associated with certainty levels that are output by the authentication machine learning model.

At 210, the trained authentication machine learning model may output a certainty level that the secure account is associated with the same user as is associated with the external account. As discussed herein, the authentication machine learning model may be trained such that its weights, layers, and/or biases are configured to output certainty levels based on an overlap or correlation between the external account data, user activity data, and/or user data. As an example, the trained authentication machine learning model may output a certainty level based on an amount of overlap between the locations extracted from the external account content when compared to the locations identified via the user activity data from the secure account. As an illustrative example, external account content including the Eiffel Tower may be compared to transactions recorded on the same day as the content including the Eiffel Tower was captured. If the transactions are from locations proximate to (e.g., relatively nearby) the Eiffel Tower, an overlap may be identified and may contribute to a certainty level indicative of a higher certainty that the secure account is associated with the same user as is associated with the external account. If the transactions are from locations outside a given range from the Eiffel Tower (e.g., a longer distance than reasonably travelled in a given amount of time), a lack of an overlap may be identified and may contribute to a certainty level indicative of a lower certainty that the secure account is associated with the same user as is associated with the external account. It will be understood that an overlap or correlation may be tiered such that the overlap or correlation is not binary. Continuing the previous example, a transaction recorded at the location of the Eiffel Tower at the same time that the content with the Eiffel Tower is captured may correspond to a stronger overlap or correlation score compared to a transaction recorded three miles away from the Eiffel Tower.

According to an implementation, the correlation or overlap may be based on multiple points of external account content. The multiple points of external account content may be used to generate context, such that a user activity data may be compared to the contextualized external account content. For example, an image may include a user performing an action or at a location, and may be posted to the external account on a given date. That given date may not correlate with a user activity from the user's secure account. A caption associated with the image may be provided and may be used to generate context associated with the image. For example, the caption may indicate that the image was from a previous night. Accordingly, a time stamp associated with the image may be updated based on the contextual information from the caption. Based on the updated time stamp, an overlap or correlation to user account activity from the previous night may be determined. It will be understood that although caption-based contextual information is disclosed in this example, contextual information may be based on any one or more of captions, metadata, additional content, inputs, or the like.

According to an implementation, past external account content may be used as context to determine an overlap or correlation with a future user activity. For example, a user may post external account content for an upcoming trip or travel. The external account content may be compared to subsequent user activity (e.g., a transaction made at the location of the trip or travel). As further discussed herein, an external account paired with a secure account may be used to verify secure account actions (e.g., transactions) based on the past external account content context. For example, a transaction in a given country different than a user's base country (e.g., country of residence or most common country in which the user transacts) may be approved based on external account content in that given country or based on past external account content indicating future travel to the given country.

According to an implementation, the overlap or correlation may be determined based on a category or type of a location, good, or service identified via external account content. For example, a social media post may include an image inside of a shoe store. The location of the shoe store may not be known, but image recognition (e.g., via an image recognition machine learning model) may be used to determine that the image corresponds to a shoe store. The category or type of location to determine an overlap or correlation with user activity (e.g., a purchase made at the shoe store) may be determined based on the image recognition or other analysis.

According to an implementation, external account data may be used to determine overlap or correlation for user activity that corresponds to online activity. Online activity may be activity that occurs over a network (e.g., without a user not being physically present at a location). External account content may correspond to online activity of the user. External account content may include content that corresponds to in-app purchases, transactions made using an online account, or the like. For example, a user may make post about an online purchase or a purchase made in an online environment (e.g., a video game). Such external account content may be used to determine overlap or correlations with user activity (e.g., a transaction corresponding to an in-app purchase). Accordingly, a user's location may not be used for such overlap or correlation determination. Rather, the online activity may be determined via external account content, and may be compared to user activity.

The certainty level may be based on a plurality of external account content, user activity data, and/or user data (e.g., data different and/or in addition to user activity data). For example, overlaps and/or correlations based on external account content, user activity data, and/or user data for a given time period (e.g., a year, a month, a week, etc.) may all be used to identify an overall certainty level. The time period may be predetermined or may be identified by the trained authentication machine learning model. For example, the trained authentication machine learning model may review a longer time period based on an amount of data available, based on a security threshold for a given user or secure account, or the like.

A certainty level may be a score, a percentage, a probability, an indication or the like. The certainty level may be expressed as a numerical value or may be one of a plurality of tiers (e.g., predetermined tiers).

At 212, a determination that the certainty level meets a certainty threshold may be made. For example, a certainty level above equal to or above a certainty threshold may meet the certainty threshold. A certainty level below a certainty threshold may not meet the certainty threshold. A certainty threshold may be a minimum certainty required to determine that a secure account corresponds to the same user that is associated with the external account. The certainty threshold may be determined based on one or more of the secure account, a given action to be triggered based on determining that the secure account corresponds to the same user that is associated with the external account, a user, an external account, a fraud score, or the like. Accordingly, a first certainty threshold for a given set of variables (e.g., user, action, external account, secure account, etc.) may be different than a second certainty threshold for a different set of variables.

According to an implementation, a first certainty threshold may be applied for less secure actions to be performed based on the secure account corresponding to the same user as the external account and a second, more stringent, certainty threshold may be applied for more secure actions. According to implementations, one or more actions based on determining that a secure account corresponds to the same user as the external account, using the first certainty threshold may be approved. However, one or more other actions (e.g., actions that require a higher level of security or risk) may not be approved based on the certainty level meeting the first certainty threshold. For these one or more other actions, a more stringent certainty threshold may be applied. Accordingly, a set of variables where a first less stringent certainty threshold is met but a second more stringent certainty threshold is not met may result in one or more less secure actions being approved and more secure actions not being approved.

According to an implementation, the trained authentication machine learning model may determine a given certainty threshold. The trained authentication machine learning model may determine the certainty threshold based on one or more variables including, but not limited to, a secure account, an external account, a user, an action to be performed, a fraud score, a history, or the like.

At 214, an external account may be paired with the secure account based on determining that the certainty level meets the certainty threshold at 212. The pairing may designate the external account as being associated with the same user as the secure account. One or more actions may be implemented based on the pairing, as discussed herein. The one or more actions may include, for example, granting access to either the secure account via access to the external account, or vice versa. The one or more actions may include approving a secure activity (e.g., a request, a transaction, a transfer, or the like) via the secure account based on verifying an external account content. For example, a transaction in a location that is not generally associated with a user may be approved based on verifying that external account content (e.g., a social media upload) corresponds to the location.

According to implementations of the disclosed subject matter, one or more additional actions may be taken based on pairing an external account with a secure account, at 214. Such actions include, but are not limited to, approving user activity (e.g., transactions), as discussed above. They may further include providing secure account communication via the external account. For example, a secure account provider may send messages via a social media external account, once the social media external account is paired with the secure account. The actions may further include approving secure actions related to the secure account, via the external account. For example, external account purchases (e.g., in-app purchases) may be automatically processed via the secure account, based on pairing the external account to the secure account.

According to an implementation, one or more customized offers (e.g. for goods or services) may be approved based on pairing an external account with a secure account. For example, external account data may be processed to determine user preferences. Such preferences may be used to identify optimal offers for the user, such that the user may benefit from the optimal offers. For example, a user may post a preference for hiking via external content uploaded to an external account. Based on paring the external account with the secure account, one or more offers for discount hiking gear may be presented to the user (e.g., via the secure account). Such targeted offerings may reduce processing and/or other resource requirements by providing a user with user specific offers by filtering from a set of offers. It may improve user usability of a platform based on the targeted offers.

Figure 2B:
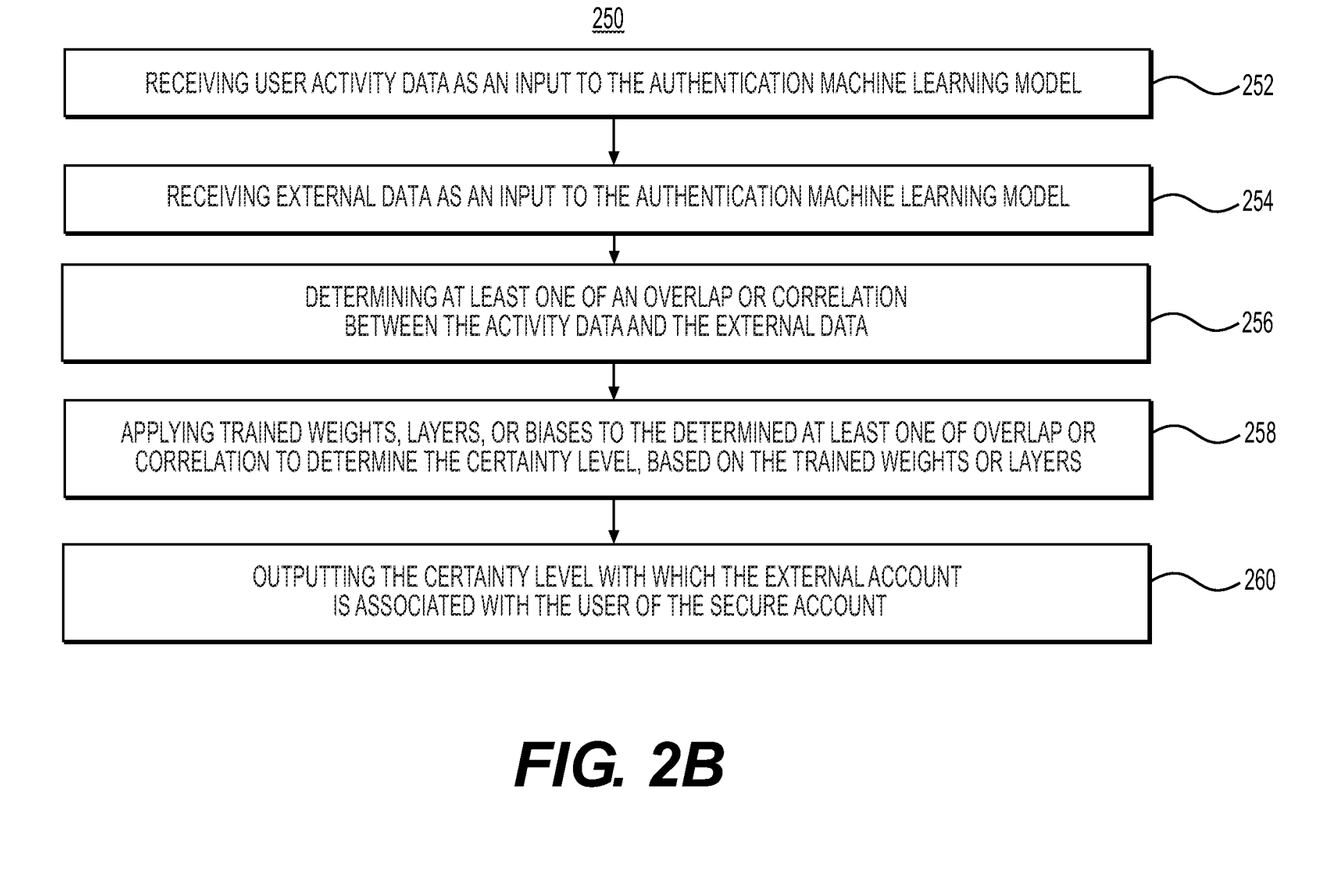
FIG. 2B depicts a flowchart of an exemplary method for outputting a certainty level, according to one or more embodiments.

FIG. 2B depicts a flowchart 250 for outputting a certainty level. As shown, at 252, user activity data may be received as an input to a trained authentication machine learning model, as disclosed herein. The user activity data may be associated with a secure account and/or one or more other sources. At 254, external account content (e.g., external data) may be received as an input to the trained authentication machine learning model, as disclosed herein. The external data may be received from an external account. At 256, at least one of an overlap and/or a correlation may be determined between the user activity and the external data, as disclosed herein. As disclosed herein, the overlap and/or correlation may further be based on user data. The determination may be made by the trained authentication machine learning model or one or more elements (e.g., a processor). At 258, trained weights, layers and/or biases of the authentication machine learning model may be applied to the determined correlation or overlap, to determine a certainty level. The certainty level may be used to determine that the external account corresponds to the user associated with the secure account, and may be output based on the applying the weights, layers and/or biases. At 260, the certainty level may be output and may be applied to pair the secure account with the external account and/or to approve or reject one or more other actions. The one or more actions may be approved or rejected based on certainty thresholds associated with the one or more actions, and comparing the certainty thresholds to the certainty level, as described above.

Figure 3:
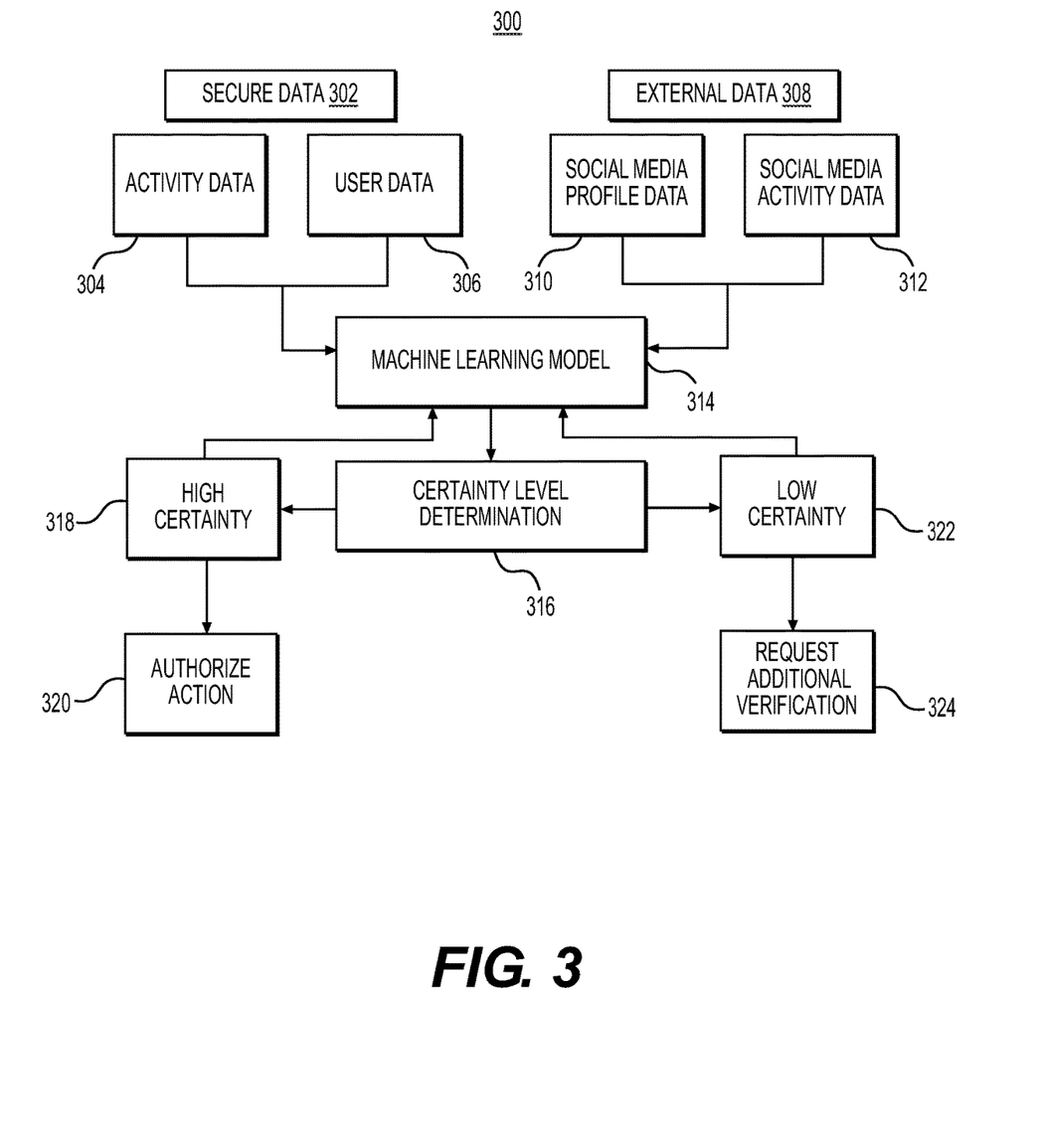
FIG. 3 depicts a flow diagram for authenticating an external account, according to one or more embodiments.

FIG. 3 depicts a flow diagram for authenticating an external account, according to embodiments disclosed herein. As shown in FIG. 3, secure data 302 may include user activity data 304 and may further include user data 306. It will be understood that additional user data in addition to user data 306, that is part of secure data 302, may also be provided by one or more other components such as a user profile. Secure data 302 may be generated and/or stored at a secure location (e.g., accessible via a secure account). Activity data 304 may correspond to activities associated with a user that may include, but are not limited to, transactions, purchases, actions, inputs, or the like. User data 306 may be data about a user and may be extracted from a secure account, an application, or based on one or more other resources having information about a given user. User data 306 may include demographic information, identification information (e.g., name, photo identification, biometric information, etc.), contact information (e.g., email, phone number, address), or the like.

External data 308 may include for example, social media profile data 310 and social media activity data 312. Categories of social media profile data 310 may overlap with categories of user data 306 and may include demographic information, identification information (e.g., name, photo identification, biometric information, etc.), contact information (e.g., email, phone number, address), or the like. Social media activity data 312 may be social media content (e.g., images, videos, text, etc., or a combination of the same), and/or activities and/or corresponding information extracted from the social media content. Such activities and/or corresponding information may be locations, landscapes, landmarks, buildings, structures, landmasses, people, animals, goods, services, or the like as well as times or relationships associated with the same.

Machine learning model 314 may be an authentication learning model, as disclosed herein, and may include one or more other machine learning models (e.g., a content recognition machine learning model). Secure data 302 including activity data 304 and user data 306, and external data 308 including social media profile data 310 and social media activity data 312 may be received at machine learning model 314. Machine learning model 314 may receive such data based on a call or request to determine whether an external account is associated with the same user as a secure account, as disclosed herein.

A certainty level determination 316 may be output by machine learning model 314, as disclosed herein. The certainty level determination 316 may be based on the secure data 302 and/or external data 308 received at machine learning model 314. If the certainty level determination 316 is a high certainty 318 such that it is above a given certainty threshold, then the external account may be designated as being associated with the same user as the secure account associated with the secure data 302. Upon the high certainty 318 determination, an action applying the external account or related data to the secure account or its data may be authorized 320. If a certainty level determination 316 is a low certainty 322 such that it is below a given certainty threshold, then the external account may not be associated with the same user as the secure account associated with the secure data 302. Upon the low certainty 322 determination, a request for additional verification may be triggered.

According to an implementation, machine learning model 314 may continue to receive updated secure data 302 and/or updated external data 308 after a high certainty 318 and/or low certainty 322 determination. The machine learning model 314 may continue to update the certainty level determination 316 based on the updated secure data 302 and/or updated external data 308 such that one or more actions are authorized 320 or additional verification is requested 324.

One or more implementations disclosed herein may be applied by using a machine learning model (e.g., an image recognition machine learning model or an authorization machine learning model). A machine learning model as disclosed herein may be trained using the system 100 of FIG. 1, flowchart 200 of FIG. 2A and flowchart 250 of FIG. 2B, and/or flowchart 300 of FIG. 3. As shown in flow diagram 410 of FIG. 4, training data 412 may include one or more of stage inputs 414 and known outcomes 418 related to a machine learning model to be trained. The stage inputs 414 may be from any applicable source including a component or set shown in FIGS. 1-3. The known outcomes 418 may be included for machine learning models generated based on supervised or semi-supervised training. An unsupervised machine learning model might not be trained using known outcomes 418. Known outcomes 418 may include known or desired outputs for future inputs similar to or in the same category as stage inputs 414 that do not have corresponding known outputs.

Figure 4:
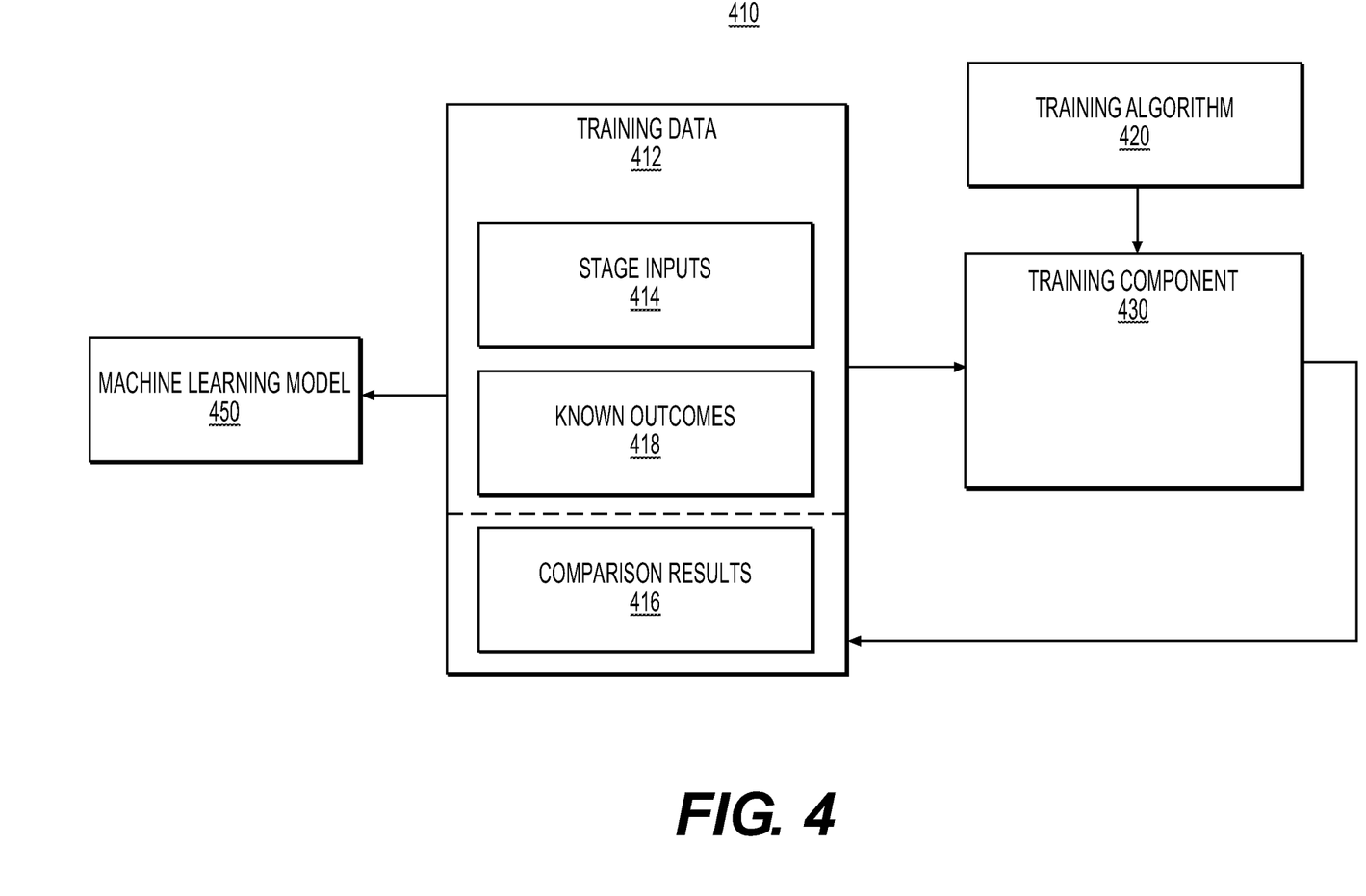
FIG. 4 depicts a flow diagram for training a machine learning model, according to one or more embodiments.

The training data 412 and a training algorithm 420 may be provided to a training component 430 that may apply the training data 412 to the training algorithm 420 to generate a trained machine learning model 450. According to an implementation, the training component 430 may be provided comparison results 416 that compare a previous output of the corresponding machine learning model to apply the previous result to re-train the machine learning model. The comparison results 416 may be used by the training component 430 to update the corresponding machine learning model. The training algorithm 420 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 410 may be a trained machine learning model 450.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes illustrated in FIGS. 2A-3, may be performed by one or more processors of a computer system, such as any of the systems or devices in the exemplary system 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
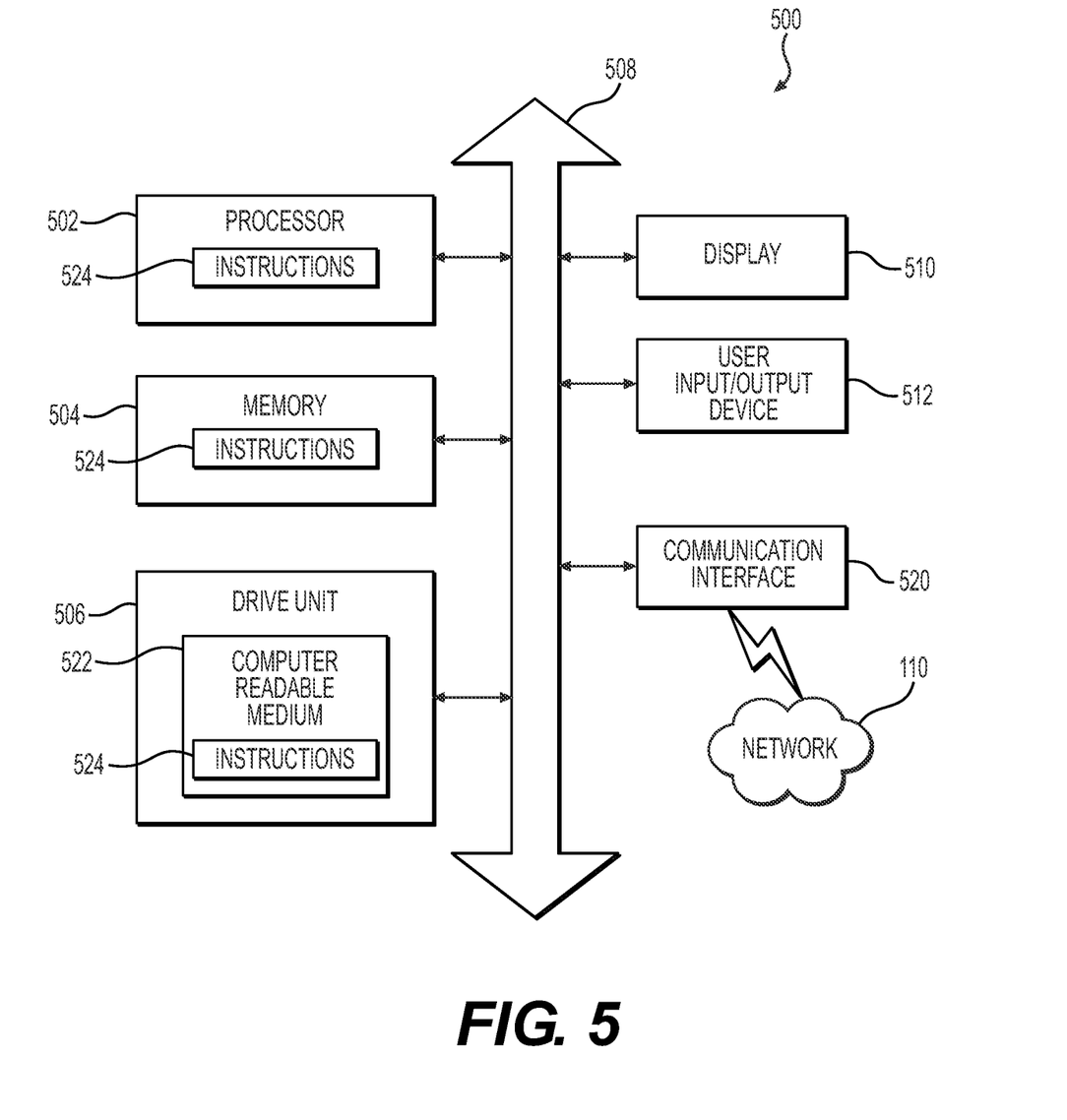
FIG. 5 depicts an example of a computing device, according to one or more embodiments.

FIG. 5 is a simplified functional block diagram of a computer 500 that may be configured as a device for executing the methods of FIGS. 2A-4, according to exemplary embodiments of the present disclosure. For example, the computer 500 may be configured as a system according to exemplary embodiments of this disclosure. In various embodiments, any of the systems herein may be a computer 500 including, for example, a data communication interface 520 for packet data communication. The computer 500 also may include a central processing unit ("CPU") 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for external account authentication, the method comprising:
   receiving a call to pair the external account with a secure account;
   extracting external data from the external account, wherein the external data corresponds to external account content;
   providing user activity data from the secure account as an input to an authentication machine learning model, the user activity data including data of transaction inactivity for a period of time;
   providing the external data as an input to the authentication machine learning model, the authentication machine learning model configured to output a certainty level that the external account is associated with a user of the secure account based on the external data and the user activity data;
   receiving the certainty level from the authentication machine learning model;
   determining that the certainty level meets a certainty threshold; and
   pairing the external account with the secure account based on determining that the certainty level meets the certainty threshold.

2. The method of claim 1, further comprising:
   providing user data as an input to the authentication machine learning model, the authentication machine learning model configured to output the certainty level that the external account is associated with the user of the secure account further based on the user data.

3. The method of claim 2, wherein the user data is extracted from the secure account.

4. The method of claim 2, wherein the user data is input by a user with the call to pair the external account.

5. The method of claim 2, wherein user data comprises at least one of an identifier, identification information, a time, a contact identifier, or a digital content.

6. The method of claim 1, wherein the activity data is extracted from the secure account based on access to the secure account.

7. The method of claim 1, wherein the activity data comprises at least one of a location, a time, an amount, a category, a product, or a service.

8. The method of claim 1, wherein the external data comprises at least one of social media profile data or social media activity data.

9. The method of claim 1, wherein the external data is user generated content posted to the external account.

10. The method of claim 1, wherein the authentication machine learning model is trained by adjusting at least one of weights, layers, or biases based on levels of overlap or correlation between the activity data and the external data.

11. The method of claim 1, further comprising:
    receiving a call to access a secure account feature;
    receiving access credentials for the external account paired with the secure account; and
    granting access to the secure account feature based on the access credentials for the external account.

12. The method of claim 1, wherein extracting external data from the external account comprises using an application programming interface (API) configured to communicate with an external account platform.

13. A method for outputting a certainty level with which an external account is associated with a user of a secure account, using an authentication machine learning model, the method comprising:
    receiving user activity data from the secure account as an input to the authentication machine learning model, the user activity data including data of transaction inactivity for a period of time;
    receiving external data from the external account as an input to the authentication machine learning model, wherein the external data corresponds to external account content;
    determining at least one of an overlap or correlation between the activity data and the external data;
    applying trained weights, layers, or biases to generate at least one of an overlap score or correlation score based on the overlap or correlation;
    determining the certainty level based on at least one of the overlap score or correlation score; and
    outputting the certainty level with which the external account is associated with the user of the secure account.

14. The method of claim 13, wherein the authentication machine learning model is trained by adjusting at least one of weights, layers, or biases based on levels of overlap or correlation between the activity data and the external data.

15. The method of claim 13, wherein the user activity data is extracted from a purchase history.

16. The method of claim 13, wherein the activity data is extracted from the secure account based on access to the secure account.

17. The method of claim 13, wherein the activity data comprises at least one of a location, a time, an amount, a category, a product, or a service.

18. The method of claim 13, wherein the external data comprises at least one of social media profile data or social media activity data.

19. The method of claim 13, wherein the external data is user generated content posted to the external account.

20. A system for external account authentication, the system comprising:
    a data storage device storing processor-readable instructions; and
    a processor operatively connected to the data storage device and configured to execute the instructions to perform operations that include:
      receiving a call to pair the external account with a secure account;
      extracting external data from the external account, wherein the external data corresponds to external account content;
      providing user activity data from the secure account as an input to an authentication machine learning model, the user activity data including data of transaction inactivity for a period of time;
      providing the external data as an input to the authentication machine learning model, the authentication machine learning model configured to output a certainty level that the external account is associated with a user of the secure account based on the external data and the activity data;

receiving the certainty level from the authentication machine learning model;
determining that the certainty level meets a certainty threshold; and
pairing the external account with the secure account based on determining that the certainty level meets the certainty threshold.

* * * * *